G. G. LENNIG.
MACHINE FOR MOLDING CHOCOLATE.
APPLICATION FILED JAN. 27, 1908.

907,382.

Patented Dec. 22, 1908.

3 SHEETS—SHEET 1.

Witnesses
P. F. Nagle
L. Douville

Inventor
George Gurdon Lennig.
By Wiedersheim & Fairbanks
Attorneys

G. G. LENNIG.
MACHINE FOR MOLDING CHOCOLATE.
APPLICATION FILED JAN. 27, 1908.

907,382.

Patented Dec. 22, 1908.

3 SHEETS—SHEET 3.

Witnesses
P. F. Nagle
L. Douville

Inventor
George Gurdon Lennig
By Wiedersheim & Fairbanks
Attorneys

UNITED STATES PATENT OFFICE.

GEORGE GURDON LENNIG, OF PHILADELPHIA, PENNSYLVANIA, ASSIGNOR TO H. O. WILBUR & SONS, OF PHILADELPHIA, PENNSYLVANIA, A FIRM.

MACHINE FOR MOLDING CHOCOLATE.

No. 907,382.          Specification of Letters Patent.          Patented Dec. 22, 1908.

Application filed January 27, 1908. Serial No. 412,766.

*To all whom it may concern:*

Be it known that I, GEORGE GURDON LENNIG, a citizen of the United States, residing in the city and county of Philadelphia, State of Pennsylvania, have invented a new and useful Machine for Molding Chocolate, of which the following is a specification.

This invention relates to a machine for molding chocolate candy, etc., and more especially to that class of machines wherein a mass of material is worked upon to form chocolates.

It consists of a machine in which the material to form the drops is placed in a receptacle or hopper having a perforated bottom through which a plurality of plungers operate to press the material out upon a receiving pan.

It further consists of a movable tray carrying plate which is adapted to be reciprocated to receive the material as it is pressed out of the perforations in the hopper and so moved as to form the drops, which are familiarly known to the trade as "buds."

It further consists of other novel features of construction, all as will be hereinafter fully set forth.

For the purpose of illustrating my invention, I have shown in the accompanying drawings those embodiments which best illustrate the principles thereof and which have been found in practice to give satisfactory and reliable results, although it is to be understood that the various instrumentalities of which my invention consists can be variously arranged and organized and that my invention is not limited to the precise arrangement and organization of these instrumentalities as herein shown.

Figure 1:
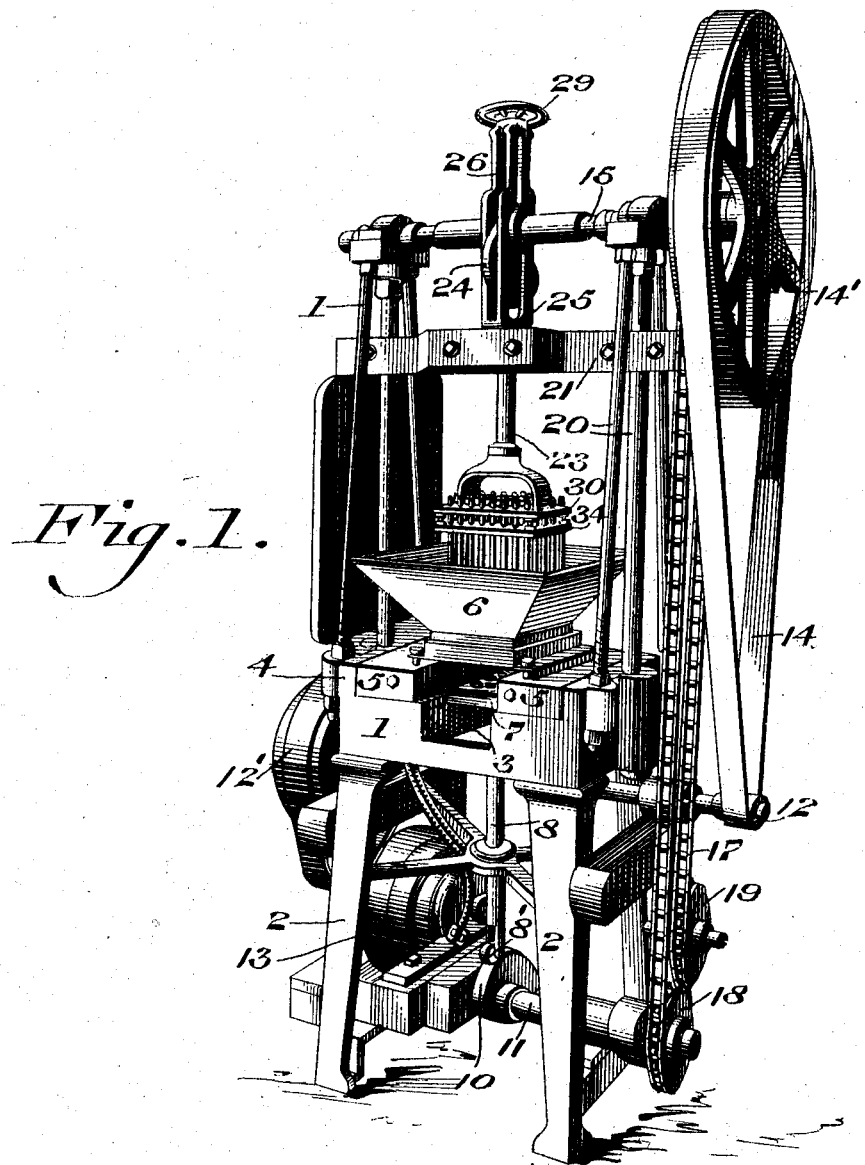
Figure 2:
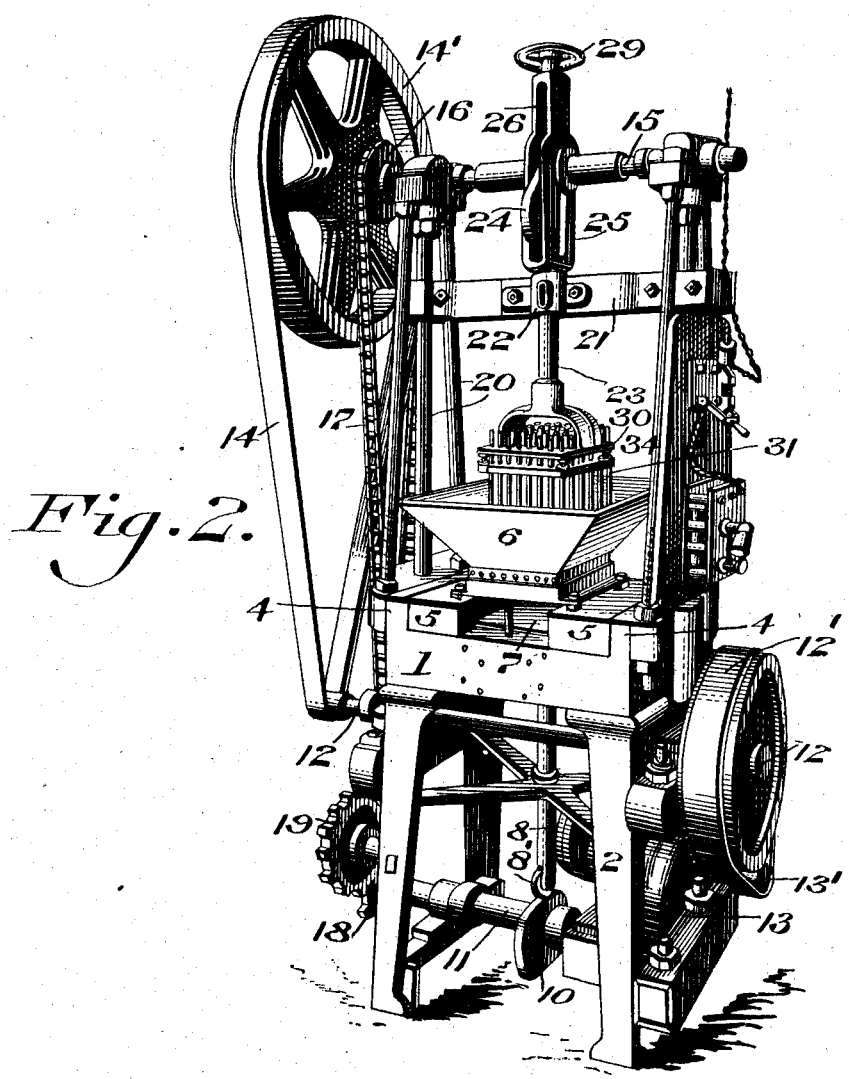
Figure 3:
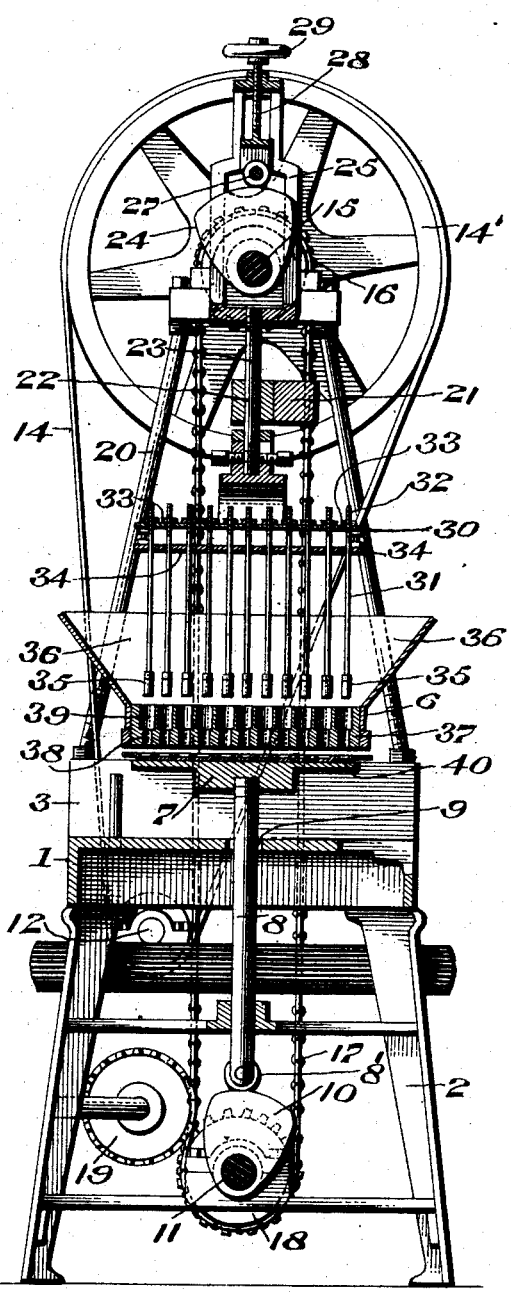
Figure 4:

Figure 1 represents a front perspective view of a machine embodying my invention. Fig. 2 represents a rear perspective view of the same. Fig. 3 represents a vertical section thereof. Fig. 4 represents a view of a finished chocolate drop or bud.

Similar numerals of reference indicate corresponding parts in the figures.

Referring to the drawings:—1 designates a table, supported on frame 2, and having a recess 3 and side flanges 4. The flanges 4 are provided to receive spacing blocks 5 for supporting a hopper 6, and also serve as guides for a lower plunger plate 7 located in recess 3 and operated by rod 8 which passes through a bearing aperture 9 in the bottom of the recess 3. The plate 7 is secured in any suitable manner to the rod 8, in the present instance being screw threaded thereon and has its top surface finished true for a purpose hereinafter to be described. This plate 7 is adapted for reciprocation at certain intervals in the cycle of operation by movement transmitted thereto by a counter shaft 11 connected to rod 8 in any manner desired to effect the result. Preferably I accomplish this movement by a cam 10 secured to shaft 11 and engaging a cam roller 8' journaled in rod 8. The cam 10 may be keyed to the shaft 11 or adjustably secured thereto as desired but the latter is the preferred method as thereby a slight change of cam 10 relative to shaft 11 will immediately effect the time of reciprocation of plate 7 and consequently make a variation in the shape of the chocolate drop or "bud".

Power is supplied to the machine from any suitable source but as herein disclosed is received from a source of electricity and transformed by motor 13 to drive shaft 13' from which power is transmitted to shaft 12 by belt 12'. From shaft 12 belt 14 transmits the power to a pulley 14' mounted on counter shaft 15 which counter shaft also carries a sprocket 16 which drives the counter shaft 11 through chain 17 and sprocket 18. An idler 19 is supported adjacent chain drive 17 for the purpose of tightening and guiding the chain. A suitable frame 20 supports counter shaft 15 and also carries a cross beam 21 provided with a bearing lug 22 which acts as a guide for an upper plunger rod 23. This rod 23 receives motion from counter shaft 15 and slides back and forth in bearing lug 22. Preferably this reciprocating movement is received from a cam 24 mounted on counter shaft 15 connection being made in any manner to accomplish the result. In the present instance the rod 23 carries a double link member or bracket 25 provided with a longitudinal slot 26 in which the cam 24 rotates, its bearing surface engaging a roller 27 adjustably mounted in link 25 by means of threaded rod 28 on which is secured operating hand wheel 29. It will be seen that as the counter shaft 15 rotates, the rod 23 is reciprocated at certain intervals according to the shape of the cam face 24 the upward movement thereof raising roller 27 and with it the link connection 25, while in the downward movement gravity allows the roller 27 to follow the cam surface.

Detachably secured to the rod 23 is a plunger frame consisting of an apertured plate 30 carrying a plurality of spindles 31 preferably adjustably secured to the plate 30 by any suitable means as the threaded ends 32 and nuts 33. Adjacent plate 30 is a second perforated plate 34 secured in such a position as to prevent lateral play of the spindles 31. The spindles 31 carry plungers 35 preferably detachably secured and serve a purpose to be presently described. Supported on the blocks 5 below the plunger frame is the hopper 6 provided with the suitable inclined sides 36 which tend to guide any material in the hopper to the outlet at the bottom. The hopper 6 is provided with a perforated bottom plate 37 made in the present instance separate from the body of the hopper 6, the two being secured together in any suitable manner. This bottom plate 37 is provided with perforations of different diameters as shown at 38 and 39, being bored a portion of its depth one size and then counterbored thus forming a series of graduated perforations, the larger openings serving to guide the material to the smaller openings, the size of which is, preferably, approximately the same as the diameter of the plungers 35. It will be clear that on a downward movement of the plungers 35 all the material in the perforations 38 will be forced out and drop on receiving plate 7. Of course the hopper 6, is accurately adjusted below the plunger frame so that each spindle 31 and its plunger 35 is alined with a perforation in the bottom plate 37. The plate 7 is adapted to support a mold 40 preferably stamped with some design upon which the candy or chocolate is dropped, and as soon as this mold is filled, which occurs at every revolution of the machine, an empty mold is substituted and the filled removed.

The hopper 6 having been filled with material the machine is started by throwing in a switch or shifting a belt and the operation of forming a chocolate drop or "bud" is as follows: The shafts 11 and 15 are revolved, by means of the driving mechanism already described to actuate the lower and upper cams 10 and 24 to reciprocate their respective plungers 8 and 23. The plunger 8 is moved upward carrying the plate 7 and mold 40 into position directly beneath the bottom plate 37 of the hopper where it is ready to receive the material forced out of the perforations therein. During this upward movement of the plate 7 the cam 24 has rotated sufficiently to allow the plunger 23 to descend and the weight of the parts carries the plunger frame down through the material and each plunger 35 fits into its opening 38 and passes therethrough ejecting the material which is contained therein. It is very important that each plunger 35 passes through, that is, projects through the corresponding openings 38 in the hopper, since the plunger on the return stroke plays an important part in the formation of the completed confection. After the material has been ejected from the perforation and is dropped on the lower plate, a small portion of it will still adhere to the bottom of the perforation and be drawn out during the upward stroke and finally drop to form the curled top of the confection known as a bud. The quantity of material in each perforation 38 is just sufficient to make one drop or "bud" and in order to give the correct shape as shown in Fig. 4 the cam 10 is faced to lower the rod 8 at the proper moment, which is just before all the material in the perforation has been forced out. This lowering of the rod 8 of course drops the plate 7 and mold 40, so that the material remaining in the perforation at this time is forced out by the plunger 35 and strings down forming a pyramidal top to the drop, which gives it a very attractive appearance. By this mechanism a large number of "buds" may be made at one operation of the machine and as fast as a mold of the drops or "buds" is filled it is removed and an empty mold substituted, the machine running continuously the while and the molds being removed and replaced.

Of course the shape of the drop or "bud" may be varied as desired by simply changing the position of cam 10 relative to the shaft 11 whereby the movement of the lower plunger rod 8 is varied so that the plate 7 moves away from the hopper 6 at a different point in the cycle of operation.

I am aware that confections have been made by the use of receptacles having perforated bottoms from which the material is forced by means of a single follower or by means of a plurality of plungers out upon a plate or tray properly positioned beneath the receptacles but in none of these prior mechanisms is shown a bottom having perforations therein of different diameters whereby a definite sized drop or "bud" is produced.

I am also aware that reciprocating plates for receiving material pressed out of a receptacle are old but there are none operating in a complete unitary structure of the character disclosed by me for making a "chocolate bud" of a definite shape and size and such structure is broadly new.

Having thus described my invention, what I claim as new and desire to secure by Letters Patent, is:—

1. In a machine for dropping chocolate or candy, the combination with a hopper having a perforated bottom, a movable frame having a plurality of plungers above said hopper, said plungers being adapted to pass through said perforated bottom to force the chocolate or candy therethrough, a movable plate below said hopper and means to reciprocate said frame and plate.

2. In a machine for dropping chocolate or candy, the combination with a hopper, a bottom therefor having graduated perforations, a movable frame having a plurality of plungers above said hopper, said plungers being adapted to pass through said perforations to force the chocolate or candy therethrough, and means to reciprocate said frame and plate.

3. In a machine for dropping chocolate or candy, the combination with a hopper, a bottom therefor having graduated perforations, a movable frame having a plurality of plungers in alinement with said perforations and adapted to pass through the latter, a movable plate below said hopper, and means to reciprocate said frame and plate.

4. In a machine for dropping chocolate or candy, the combination with a hopper having a perforated bottom, a movable frame having a plurality of plungers adapted to pass through such perforations, a movable plate below said hopper, and means to vary the stroke of said plate relative to the frame.

5. In a machine for dropping chocolate or candy, the combination with a hopper having a perforated bottom, a movable frame having a plurality of plungers adapted to pass through the perforations of said bottom, a movable plate below said hopper, means for reciprocating said frame and plate and means to vary the stroke of said plate relative to said frame.

6. In a machine for dropping chocolate or candy, the combination with a hopper, having a bottom provided with openings of different diameters, a movable frame having a plurality of spindles above said hopper, plungers detachably secured to said spindles and adapted to pass through one of said openings, a movable plate below said hopper and means to reciprocate said frame and plate.

7. In a machine for dropping chocolate or candy, the combination with a hopper having a bottom provided with openings of different diameters, a movable frame having a plurality of spindles above said hopper, plungers on said spindles adapted to fit the perforations in said hopper bottom and pass therethrough, a movable plate below said hopper and means to reciprocate said frame and plate.

8. In a machine for dropping chocolate or candy, the combination with a hopper having a perforated bottom, a movable frame having a plurality of plungers above said hopper, said plungers being adapted to pass through the perforations of said bottom, a movable plate below said hopper, cams adapted to reciprocate said frame and plate and means to operate said cams.

9. In a machine for dropping chocolate or candy, the combination with a hopper having a perforated bottom, a movable frame having a plurality of plungers above said hopper and adapted to pass through the perforations in the bottom thereof, a movable plate below said hopper, a cam adapted to reciprocate said frame, an adjustable cam adapted to reciprocate said plate and means to operate said cams.

10. In a machine for dropping chocolate or candy, the combination with a hopper having a perforated bottom, a movable frame having a plurality of plungers above said hopper and adapted to pass through said perforations, a movable plate below said hopper, cams adapted to reciprocate said frame and plate, shafts carrying said cams, a driving shaft and means transmitting power from said driving shaft to said cam shafts.

11. In a chocolate or candy machine, a hopper, a bottom therefor having differential apertures, plungers on one side of said apertures and adapted to pass therethrough, a mold carrier on the opposite side of said apertures, and means for simultaneously actuating said plungers and carriers.

12. In a chocolate or candy machine, a hopper, a bottom therefor having differential apertures, plungers on one side of said apertures and adapted to pass therethrough, a mold carrier on the opposite side of said apertures, means for simultaneously actuating said plungers and carriers, and means for adjusting the relative movement of said plungers and carriers.

13. In a chocolate or candy machine, a spindle carrier, a multiplicity of spindles carried thereby, plungers on said spindles, a hopper, a bottom therefor having apertures in alinement with said plungers and through which the latter pass, a mold carrier beneath said bottom, cams for actuating said carriers, a motor for driving said cams, and means for adjusting one of said cams to vary the relative time of movement of said carriers.

14. In a chocolate or candy machine, a spindle carrier, a multiplicity of plungers adjustably carried thereby, a bracket connected with said carrier, a roller adjustably carried by said bracket, a cam coacting with said roller, a mold carrier, a roller connected therewith, a cam coacting with said last named roller, a stationary member located intermediate said plungers and having apertures in alinement therewith, and driving means for said cams.

GEO. GURDON LENNIG.

Witnesses:
 MARY F. DOWNEY,
 EDWARD R. HOWARD.